United States Patent [19]

Tanaka

[11] Patent Number: 4,674,852
[45] Date of Patent: Jun. 23, 1987

[54] COUPLING CONSTRUCTION OF A FRAME OF SPECTACLES AND A COUPLING HOLDER

[75] Inventor: Kenji Tanaka, Tokyo, Japan

[73] Assignee: Driden Anstalt, Vaduz, Fed. Rep. of Germany

[21] Appl. No.: 711,728

[22] Filed: Mar. 15, 1985

[30] Foreign Application Priority Data

Mar. 16, 1984 [JP] Japan ................................. 59-48997

[51] Int. Cl.$^4$ ................................................ G02C 1/08
[52] U.S. Cl. ................................................ 351/90
[58] Field of Search ...................... 351/90, 91, 92, 93, 351/94, 95, 96, 97, 98, 99, 100, 101, 102

[56] References Cited

U.S. PATENT DOCUMENTS 1,613,765  1/1927  Nerney ................................. 351/99

FOREIGN PATENT DOCUMENTS 3327501  4/1984  Fed. Rep. of Germany ........ 351/90

Primary Examiner—Rodney B. Bovernick
Attorney, Agent, or Firm—Dick and Harris

[57] ABSTRACT

In a coupling construction of a frame of spectacles 2 of light alloy a coupling holder 4 of even metal with a joint for a hinging mechanism to connect the bows of the spectacles thereto is screwed to cut seat members 1,3 projecting integrally from cut ends of the frame of spectacles 2. Two screws 5,6 being screwed into each other are provided to secure the coupling holder 4 to the seat members 1,3. With the screw 5 of a more durable metal than light metal the coupling holder 4 is fastened to one of the seat members 1,3. To secure the other seat member 1,3 to the coupling holder 4 as well the screw 6 is passed through that seat member 1,3 and inserted into a longitudinally screwed hole in the screw 5. According to this a secure screw joint between the coupling holder 4 and the seat members 1,3 is achieved and the joint can be opened and reclosed unlimitedly without failure due to weak light alloy threads.

5 Claims, 3 Drawing Figures

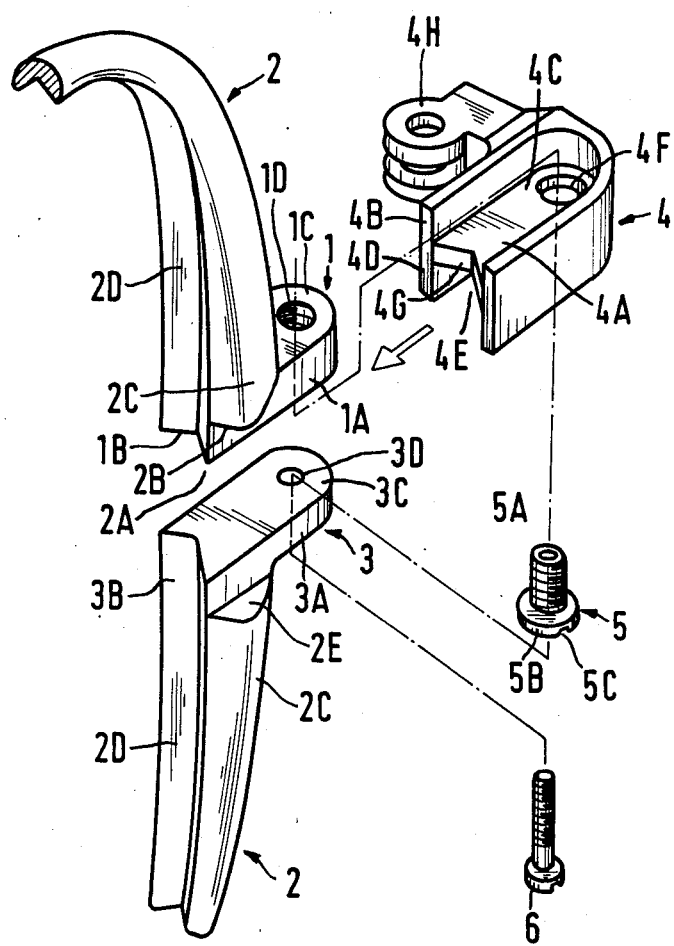

COUPLING CONSTRUCTION OF A FRAME OF SPECTACLES AND A COUPLING HOLDER

BRIEF DESCRIPTION OF THE DRAWINGS

FIG. 1(a) is an exploded perspective view of the preferred embodiment of the present invention showing upper cut seat member 1, frame of spectacles 2, lower cut seat member 3, coupling holder 4, and screws 5 and 6.

DETAILED DESCRIPTION OF THE INVENTION

The present invention relates to a coupling construction of a frame of spectacles and a coupling holder which can lighten the whole weight of the spectacles and decorate them.

Recently, aiming lightness and decoration has been widely prevailed. For the purpose of lightening the pair of spectacles lenses for spectacles have been lightened, for example, adoption of plastic lenses has been already practised, and in addition application of light alloys such as alluminium alloy, titan alloy etc. for lightening weights of the frame, coupling holder and bows of the pair of spectacles has been attracting persons' attentions. Further, besides decorated frame of the spectacles, shapes of a coupling holder, a bow of the spectacles, decorations therefore are advancing.

However, the frame of the spectacles and the coupling holder connected with the bow of the spectacles by a hinging means are connected with each other meltedly, so that according to kind of alloys the frame and/or the coupling holder are liable to be excessively melted. And further it is also liable to erase patterns formed onto the frame or the coupling holder or change colors thereof.

Accordingly, there are disadvantages, as described above, such as preventing the spectacles from lightness and damaging decoration, patterns on the frame and/or the coupling holder in the conventional spectacles.

The object of the present invention is to solve the above mentioned conventional art in which the coupling construction of a frame and a coupling holder of a pair of spectacles consists of an upper cut seat member and a lower cut seat member on a notch (which has cut portions at both ends) of the frame of the spectacles, and on the upper cut seat member a screwed hole or an aperture is bored and onto the lower cut seat member an aperture or a screwed hole is also bored, a partition wall of the coupling holder which is held between the upper cut seat member and the lower cut seat member is provided with a stepped hole, the upper cut seat member or the lower cut seat member and the coupling holder are fixed by screwing a screw into the screwed hole and at the same time by screwing the screw into the screwed hole the coupling holder is secured to the lower cut seat member or the upper cut seat member.

Hereinafter the present invention is explained in detail with resspect to a preferred embodiment referring to the accompanying drawings.

Figure 1B:
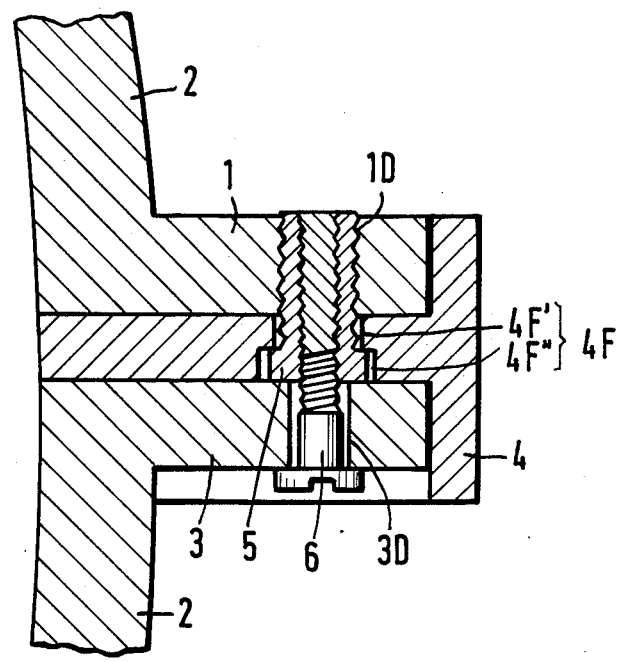
FIG. 1(b) is a cross-sectional view of the coupling construction in the assembled condition.
Figure 1C:
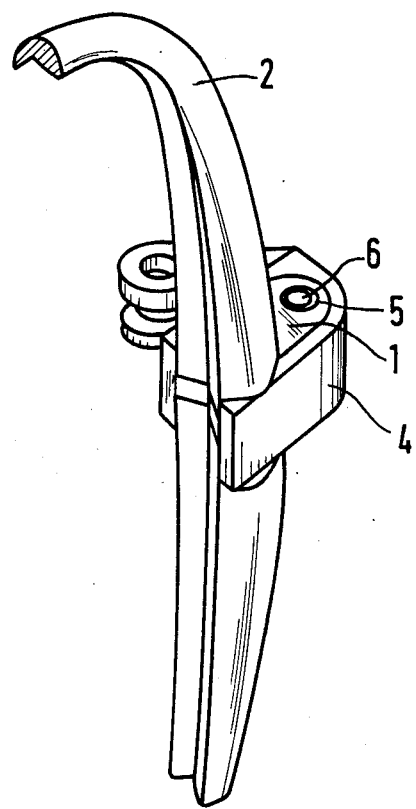
FIG. 1(c) is a perspective view of the coupling construction in the assembled condition.

FIGS. 1(a), 1(b) and 1(c) illustrate the preferred embodiment of the present invention.

As shown in FIGS. 1(a), 1(b) and 1(c), the reference number 1 designates an upper cut seat member and is formed at a notch 2A which is cut at both ends of a frame 2 of spectacles. The upper cut seat member 1, as shown in FIG. 1(a) is projected outwardly from an upper cut edge 2B of the frame 2, and the front side 1A of the upper cut seat member 1 is sunk in the back side from the front faced side 2C of the frame 2, that is, the upper cut seat member 1, becomes hollow at the back side from the side 2C of the frame 2. On the inner side surface of the upper cut seat member 1 a notched portion 1B which coincides with a lens fitting groove 2D of the frame of the spectacles is provided, and on the upper surface 3C of a lower cut seat member 3, there is bored an aperture 3D.

The reference number 4 as shown in FIGS. 1(a), 1(b) and 1(c), designates a coupling holder, and it is constructed as a U shaped hollow body the intermediate portion of which as shown in FIG. 1(a) is divided into two parts by a partition wall 4A, on the partition wall 4A there is provided an upper cut seat member receiving chamber 4C surrounded by an upper wall 4B, and quite same manner as mentioned above, a lower cut seat member receiving chamber 4E surrounded by a lower wall 4D is provided under the partition wall 4A, and further the screwed hole 1D on the upper cut seat member 1 and the aperture 3D of the lower cut seat member 3 are communicated with each other and partial spaced and stepped aperture 4F is provided. The partial spaced and stepped aperture 4F, as shown in FIGS. 1(a) and 1(b), is comprised of a through hole 4F having small diameter into which a screw to the referred after is inserted and a hole 4F" shown in FIG. 1(b) having a larger diameter for receiving head portion of the screw. In addition the referene number 4G shown in FIG. 1(a) designates a notch which coincides with the lens fitting groove 2D of the frame 2 of the spectacles, and the reference number 4H is a joint for hinging mechanism to connect a bow which is not shown in the drawing.

The reference numbers as seen in FIGS. 1(a), 1(b) and 1(c) designates a screw at the center of which a screwed hole 5A is bored and on the head portion 5B a groove 5C shown in FIG. 1(a) for inserting a minus driver is cut. With the screw 5 the upper cut seat member 1 is fixed to the coupling holder 4.

The reference number 6 designates a screw which fixes up the coupling holder 4 with the lower cut seat member 3 as shown in FIGS. 1(a), 1(b) and 1(c). Coupling the frame 2 of the spectacles with the coupling holder 4 in performed as follows, as shown in FIG. 1(a). At first by widening space between the upper cut seat member 1 and the lower cut seat member 3, the coupling holder 4 is inserted into the space to accommodate the upper cut seat member 1 in the upper cut seat member receiving chamber 4C and accommodate the lower cut seat member 3 in the lower cut seat member receiving chamber 4E, and further the coupling holder 4, that is, that part of partition wall 4A is held between the upper cut seat member 1 and the lower cut seat member 3.

Next, by opening the lower cut seat member 3, the screw 5, as shown in FIG. 1(a) is screwed into the screwed hole 1D through the partial spaced hole 4F by which the upper cut seat member 1 and the cupling holder 4 is fixed.

Next, at a state of the lower cut seat member 3 being opened, a lens (not shown in the drawings) for the spectacles is fitted into the lens fitting groove 2D shown in FIG. 1(a), those notched portions 1B, 3B and 4B, then the lower cut seat member 3 is closed and a screw 6 is inserted into the aperture and the screw 5 is screwed into the screwed hole 5A to fix the coupling holder 4 to the lower cut seat member 3.

In the case of exchanging a lens or lenses of the spectacles, it is easily carried out by releasing the screw 6. When lens or lenses are exchanged, the upper cut seat member 1 and the coupling holder 4 are fixed together by the screw 5 and are integrally with each other, so that work for exchanging lenses is quite easy.

In addition, though not shown in the drawings, it is also possible to construct as follows, that is, on the upper cut seat member 1 an aperture is bored, a screwed hole is bored on the lower cut seat member 3, and the through hole 4F' and the receiving hole 4F'' of the coupling holder 4 are inversely bored, that is, the through hole 4F' and the receiving hole 4F'' may be inversely positioned with each other, and further by the screw 5 the lower cut seat member 3 and the coupling holder 4 are fixed or the coupling holder 4 and the upper cut seat member 1 are secured to each other by the screw 6.

In the present invention as seen from FIGS. 1(b) and 1(c), the frame 2 of the spectacles and the coupling holder 4 are mechanically coupled by means of the upper cut seat member 1, the lower cut seat member 3, the screw 5 and the screw 6, so that the frame 2 of the spectacles or the coupling holder 4 made of light metals to which no meltedly coupling cannot be applied can be practically adopted. In addition according to the present invention patterns or figures formed on the coupling holder 4 and/or the frame 2 are never disappeared or faded. Thus, according to the present invention, the predetermined objects, that is, lightening weight of the spectacles and decorating the spectacles can be easily achieved.

As described the above, the present invention is constructed as follows, that is, cut portions of both ends of a frame of the spectacles there are formed an upper cut seat member and a lower cut seat member, a screw hole or an aperture is bored on said upper cut seat member, an aperture or a screwed hole is bored on said lower cut seat member, a partially spaced hole having steps is provided on a partition wall of a coupling holder being held between said upper cut seat member and said lower cut seat member, a screw for which a screwed hole is bored is screwed into said screwed hole to fix said upper cut seat member or said lower cut seat member to said coupling holder, and a screw is screwed into a screwed hole for said screw to fix said coupling holder and said lower cut seat member or to said upper cut seat member. Thus, according to the above described construction conspicuous effects that lightening weight of the spectacles and decorating the spectacles can be realized in the present invention.

I claim:

1. A coupling construction of a divided frame for a pair of spectacles including a coupling holder, characterized in that:
   a first cut seat member is formed at cut portions of both ends of said frame;
   a second cut seat member is formed at cut portions of both ends of said frame;
   said first cut seat member having a threaded hole bored therein,
   said second cut seat member having an aperture bored therethrough,
   said coupling holder having at least one partition wall interposed and extending between said first cut seat member and said second cut seat member;
   said coupling holder having a partially spaced hole having steps is provided on said partition wall thereof and aligned with said screw holders or apertures on said first and second cut seat members;
   said coupling holder being operatively held between said first cut seat member and said second cut seat member,
   a first screw, through which a threaded hole is bored, is passed through said coupling holder hole and is screwed into said threaded hole in said first cut seat member to fix said first cut seat member to said coupling holder; and,
   a second screw is inserted through said aperture in said second cut seat member and secured within said threaded hole of said first screw for said second screw to fix said second cut seat member to said coupling holder.

2. The invention according to claim 1 wherein said coupling construction further comprises:
   said divided frame and said coupling holder being formed of substantially the same aluminum-type material; and
   said first screw being comprised of a material having substantially superior mechanical qualities than said frame and coupling holder material.

3. The invention according to claim 1 wherein said first screw is provided with a screw head configuration which is countersinkable into a recessed portion of said partition wall surrounding said coupling holder hole.

4. The invention according to claim 1 wherein said coupling holder further comprises:
   said partition wall comprising the center piece of a substantially U-shaped frame having upstanding edge portions; and
   said edge portions rising above said partition wall.

5. A coupling construction of a divided frame for a pair of spectacles including a coupling holder, characterized in that:
   an upper cut seat member and a lower cut seat member formed at cut portions of both ends of a frame of spectacles;
   said upper cut seat member, having an aperture bored therein;
   said lower cut seat member, having a threaded hole bored therein;
   said coupling holder being held between said upper cut seat member and said lower cut seat member;
   said coupling holder having at least one partition wall extending between said upper cut seat member and said lower cut seat member;
   said coupling holder having a partially spaced hole having steps formed in said partition wall thereof;
   a first screw, through which a threaded hole is bored, is passed through said coupling holder hole and screwed into said threaded hole of said lower cut seat member to fix said lower cut seat member to said coupling holder; and,
   a second screw is inserted through said aperture in said upper cut seat member and screwed into said threaded hole in said first screw for said second screw to fix said coupling holder with said upper cut seat member.

* * * * *

UNITED STATES PATENT AND TRADEMARK OFFICE
CERTIFICATE OF CORRECTION

PATENT NO. : 4,674,852

DATED : June 23, 1987

INVENTOR(S) : Kenji Tanaka

It is certified that error appears in the above-identified patent and that said Letters Patent is hereby corrected as shown below:

Column 1, line 63, "resspect" should be --respect--

Column 2, line 34, "referene" should be --reference--

Column 2, line 39, "numbers" should be --number 5--

Signed and Sealed this

Ninth Day of February, 1988

Attest:

DONALD J. QUIGG

Attesting Officer

Commissioner of Patents and Trademarks